United States Patent
Zhao (10) Patent No.: US 9,008,250 B2
(45) Date of Patent: Apr. 14, 2015

(54) METHOD, MODEM, AND SYSTEM FOR CANCELING ADJACENT CHANNEL INTERFERENCE

(71) Applicant: Huawei Technologies Co., Ltd., Shenzhen, Guangdong (CN)

(72) Inventor: Guixue Zhao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/772,098

(22) Filed: Feb. 20, 2013

(65) Prior Publication Data
US 2013/0177053 A1   Jul. 11, 2013

Related U.S. Application Data

(63) Continuation of application No. PCT/CN2011/083382, filed on Dec. 2, 2011.

(51) Int. Cl.
*H04B 1/10* (2006.01)
*H04L 1/00* (2006.01)

(52) U.S. Cl.
CPC ............ *H04L 1/0036* (2013.01); *H04B 1/1027* (2013.01); *H04B 2001/1045* (2013.01)

(58) Field of Classification Search
CPC .................... H04L 1/0036; H04B 2001/1045; H04B 1/7107; H04B 1/7097; H04B 1/7103; H04B 2001/71077
USPC .................. 375/341, 346, 349, 350, 148, 340; 455/63.1, 296, 307, 303
See application file for complete search history.

(56) References Cited

U.S. PATENT DOCUMENTS

| | | | |
|---|---|---|---|
| 4,989,262 A | * | 1/1991 | Saito .............................. 455/138 |
| 5,559,468 A | | 9/1996 | Gailus et al. |

(Continued)

FOREIGN PATENT DOCUMENTS

| | | |
|---|---|---|
| CN | 1101181 A | 4/1995 |
| CN | 1538650 A | 10/2004 |

(Continued)

OTHER PUBLICATIONS

International Search Report and the Written Opinion of the International Searching Authority dated Sep. 13, 2012 in connection with International Patent Application No. PCT/CN2011/083382.

(Continued)

*Primary Examiner* — Sophia Vlahos (57) ABSTRACT

A method for canceling adjacent channel interference includes: receiving signal of a first channel, where an interference signal of a second channel remains in the signal of the first channel, and the second channel and the first channel are adjacent channels; receiving a cancellation signal provided by the second channel for canceling the interference signal; filtering the received cancellation signal; adjusting a frequency of the filtered cancellation signal; multiplying the cancellation signal with the adjusted frequency by a gain factor to obtain a signal to be cancelled; and subtracting the signal to be cancelled from the signal of the first channel, and canceling the interference signal to obtain a signal to be decoded. According to the technical solutions provided in the embodiments of the present invention, interference signals of adjacent channels are cancelled, and the signal to noise ratio is improved.

6 Claims, 10 Drawing Sheets

(56) References Cited

U.S. PATENT DOCUMENTS

| | | | |
|---|---|---|---|
| 5,894,500 A | | 4/1999 | Bruckert et al. |
| 5,896,424 A | * | 4/1999 | Uchida et al. ............... 375/346 |
| 6,137,843 A | * | 10/2000 | Chennakeshu et al. ....... 375/340 |
| 6,993,287 B2 | | 1/2006 | O'Neill |
| 8,340,583 B2 | * | 12/2012 | Murakami ................... 455/63.1 |
| 8,594,255 B2 | * | 11/2013 | Mashino et al. ............. 375/346 |
| 2002/0196876 A1 | * | 12/2002 | Takada ......................... 375/346 |
| 2004/0176027 A1 | | 9/2004 | O'Neill |
| 2007/0183547 A1 | * | 8/2007 | Fifield et al. ................. 375/349 |
| 2009/0227247 A1 | | 9/2009 | Byun et al. |
| 2010/0041358 A1 | * | 2/2010 | Wood ......................... 455/226.3 |
| 2010/0178874 A1 | * | 7/2010 | Chiou et al. ................. 455/63.1 |

FOREIGN PATENT DOCUMENTS

| | | |
|---|---|---|
| CN | 101056285 A | 10/2007 |
| CN | 101060510 A | 10/2007 |
| CN | 101232298 A | 7/2008 |

OTHER PUBLICATIONS

Seiichi Sampeh, et al., "Rejection Method of Adjacent Channel Interference for Digital Land Mobile Communications", The Transactions of the IECE of Japan, vol. E 69, No. 5, May 1986, p. 578-580.

Shu-yuan Shao, et al., "Estimation of Interference Delay in PCMA System", Information and Electronic Engineering, vol. 4, No. 1, Feb. 2006, 11 pages.

* cited by examiner

METHOD, MODEM, AND SYSTEM FOR CANCELING ADJACENT CHANNEL INTERFERENCE

CROSS-REFERENCE TO RELATED APPLICATIONS

This application is a continuation of International Application No. PCT/CN2011/083382, filed on Dec. 2, 2011, which is hereby incorporated by reference in its entirety.

TECHNICAL FIELD

The present invention relates to the field of communications technologies, and in particular, to a method, a modem (modem), and a system for canceling adjacent channel interference.

BACKGROUND

In a digital microwave system, microwave devices normally need to be installed outdoors, for example, mounted on a tower or pole. On some occasions, an operator needs to pay fees by area occupied. Therefore, the operator wishes to use fewer devices to transmit a larger amount of data. In the prior art, the solution to this problem is: using the dual-channel bonding technology in collaboration with the high-order quadrature amplitude modulation (QAM, Quadrature Amplitude Modulation) technology. This method saves devices and installation costs while improving the data transmission capacity, and therefore is popular among operators. The specific process of collaboration of the dual-channel bonding technology with the high-order QAM modulation technology may be understood by referring to FIG. 1. A first modulation signal in a modem 1 and a second modulation signal in a modem 2 at a transmitting end are combined and enter an antenna. The combined modulation signals are transmitted to a receiving end through the antenna. Before the first modulation signal is demodulated in a modem 1 and the second modulation signal is demodulated in a modem 2 at the receiving end, the combined modulation signals need to be split into two paths. The first modulation signal needs to be separated from the second modulation signal. After separation, the first modulation signal enters the modem 1 at the receiving end for demodulation, and the second modulation signal enters the modem 2 at the receiving end for demodulation. Although this dual-channel bonding technology satisfies the requirement for improving the signal bandwidth, adjacent channel interference will be caused when the modulation signal of two adjacent channels are bonded and then separated. To be specific, the first modulation signal cannot be completely separated from the second modulation signal at the receiving end, a part of the second modulation signal remains in the first modulation signal, and similarly, a part of the first modulation signal remains in the second modulation signal.

In the prior art, the method for solving the problem of adjacent channel interference is filtering the separated two paths of modulation signals by using a band pass filter (BPF, Band Pass Filter) before the separated two paths of modulation signals enter the modem 1 and the modem 2 at the receiving end, and designing a low pass filter (LPF, low pass filter) in the modem 1 and the modem 2 respectively to filter the received modulation signals before the signals are decoded.

In the prior art, the modulation signals are filtered by the band pass filter and the low pass filter before being decoded. However, the band pass filter's capability of filtering the modulation signals of the adjacent channels is quite limited. The interference signals of the adjacent channels are filtered by only the low pass filter in the modem. Therefore, a large number of adjacent channel interference signals may remain, which causes remarkable decrease of the signal to noise ratio.

SUMMARY

Embodiments of the present invention provide a method for canceling adjacent channel interference, which can cancel interference signals of adjacent channels and improve the signal to noise ratio. Embodiments of the present invention also provide a corresponding modem.

A method for canceling adjacent channel interference includes:

receiving a signal of a first channel, where an interference signal of a second channel remains in the signal of the first channel, and the second channel and the first channel are adjacent channels;

receiving a cancellation signal provided by the second channel for canceling the interference signal;

filtering the received cancellation signal so that phase characteristics and amplitude variation characteristics of the filtered cancellation signal are the same as phase characteristics and amplitude variation characteristics of the interference signal of the second channel that remains in the signal of the first channel;

adjusting a frequency of the filtered cancellation signal, where the adjusted frequency of the cancellation signal is the same as a frequency of the interference signal;

multiplying the cancellation signal with the adjusted frequency by a gain factor to obtain a signal to be cancelled; and subtracting the signal to be cancelled from the signal of the first channel, and canceling the interference signal to obtain a signal to be decoded.

A modem includes:

a signal receiving unit, configured to receive a signal of a first channel, where an interference signal of a second channel remains in the signal of the first channel, and the second channel and the first channel are adjacent channels;

where the signal receiving unit is further configured to receive a cancellation signal provided by the second channel for canceling the interference signal;

a first signal filtering unit, configured to filter the cancellation signal received by the signal receiving unit so that phase characteristics and amplitude variation characteristics of the filtered cancellation signal are the same as phase characteristics and amplitude variation characteristics of the interference signal of the second channel that remains in the signal of the first channel;

a frequency adjusting unit, configured to adjust a frequency of the cancellation signal filtered by the first signal filtering unit, where the adjusted frequency of the cancellation signal is the same as a frequency of the interference signal;

a gain compensating unit, configured to multiply the cancellation signal with the frequency adjusted by the frequency adjusting unit by a gain factor to obtain a signal to be cancelled; and an interference signal canceling unit, configured to subtract the signal to be cancelled that is obtained by the gain compensating unit, from the signal of the first channel, and cancel the interference signal to obtain a signal to be decoded.

A digital microwave system includes:

two channels, where the two channels are adjacent channels and signals of the two channels are mutual interference signals;

where each channel includes a modem described in the above technical solutions.

Embodiments of the present invention include: receiving the signal of the first channel, where the interference signal of an adjacent channel remains in the signal of the first channel; receiving the cancellation signal provided by the adjacent channel for canceling the interference signal; filtering the received cancellation signal so that phase characteristics and amplitude variation characteristics of the filtered cancellation signal are the same as phase characteristics and amplitude variation characteristics of the interference signal remaining in the signal of the first channel; adjusting the frequency of the filtered cancellation signal, where the adjusted frequency of the cancellation signal is the same as the frequency of the interference signal; multiplying the cancellation signal with the adjusted frequency by the gain factor to obtain the signal to be cancelled; and subtracting the signal to be cancelled from the signal of the first channel, and canceling the interference signal to obtain the signal to be decoded. Compared with the prior art, the method for canceling adjacent channel interference according to the embodiments of the present invention can cancel the interference signal of the adjacent channel and improve the signal to noise ratio.

DETAILED DESCRIPTION

Embodiments of the present invention provide a method for canceling adjacent channel interference, which can cancel interference signals of adjacent channels and improve the signal to noise ratio. Embodiments of the present invention also provide a corresponding modem. The following describes the method and the modem in detail.

Figure 2:
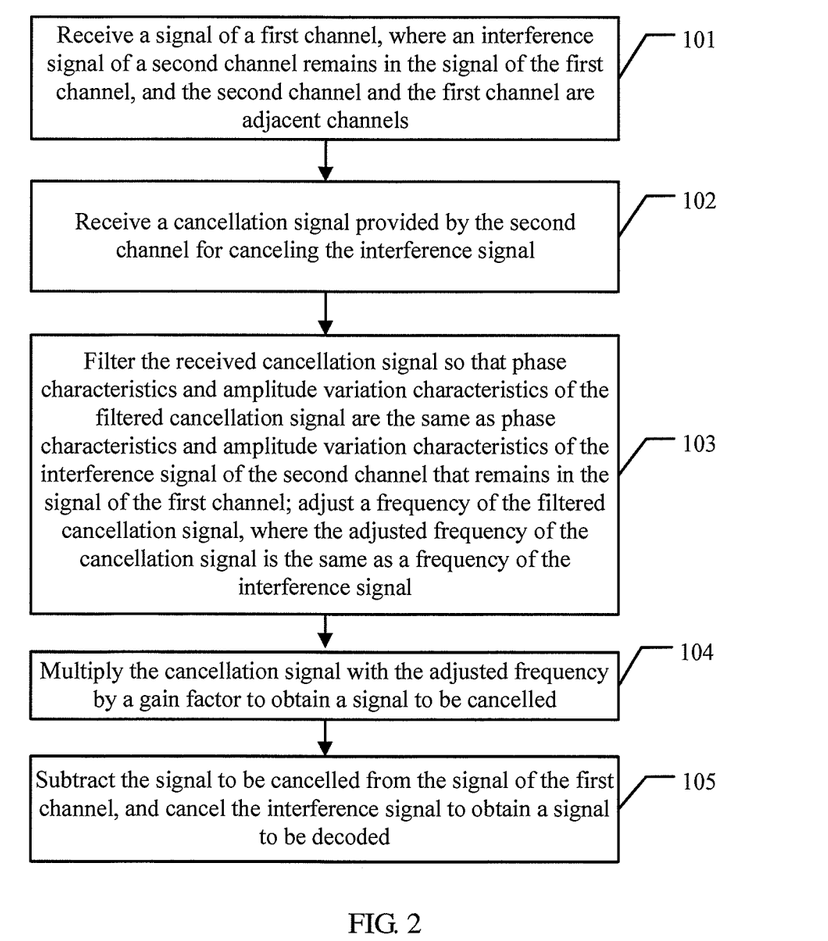
FIG. 2 is a schematic diagram of a method for canceling an interference signal according to an embodiment of the present invention.

Referring to FIG. 2, a method for canceling adjacent channel interference according to an embodiment of the present invention includes:

101. Receive a signal of a first channel, where an interference signal of a second channel remains in the signal of the first channel, and the second channel and the first channel are adjacent channels.

Figure 1:
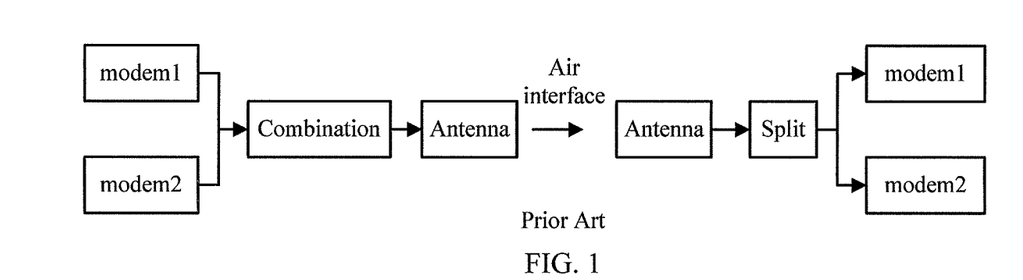
FIG. 1 is a schematic diagram of signal transmission using a dual-channel bonding technology in the prior art.

The dual-channel bonding technology refers to combining two paths of modulation signals and sending the signals to a receiving end simultaneously, and separating the two paths of signals before demodulation by a modem at the receiving end, that is, separating the signals into two channels. As shown in FIG. 1, a first modulation signal transmitted by a modem 1 at the transmitting end needs to be demodulated in a modem 1 at the receiving end, and a second modulation signal transmitted by a modem 2 at the transmitting end needs to be demodulated in a modem 2 at the receiving end. However, the two paths of signals fail to be recovered to what they are before the combination if experiencing a combination and separation. This is mainly because the two paths of signals cannot be effectively separated by an analog filter, a large number of the second modulation signals remain in the first modulation signal, and a large number of the first modulation signals remain in the second modulation signal. To be specific, a large number of signals of the second channel remain in the signal of the first channel, and a large number of signals of the first channel remain in the signal of the second channel. The first channel and the second channel are adjacent channels, and the signal of the first channel and the signal of the second channel are mutual interference signals.

102. Receive a cancellation signal provided by the second channel for canceling the interference signal.

The interference signal may affect the quality of a decoded signal. Therefore, before signal decoding, the interference signal in the signal of the first channel needs to be cancelled as far as possible. The interference signal of the second channel remains in the signal of the first channel. If the second channel is capable of providing the cancellation signal, the interference signal in the signal of the first channel can be cancelled.

103. Filter the received cancellation signal so that phase characteristics and amplitude variation characteristics of the filtered cancellation signal are the same as phase characteristics and amplitude variation characteristics of the interference signal of the second channel that remains in the signal of the first channel; adjust a frequency of the filtered cancellation signal, where the adjusted frequency of the cancellation signal is the same as a frequency of the interference signal.

After receiving a modulation signal, the modem needs to firstly perform IQ demodulation. The function of the IQ demodulation is to recover quadrature modulation signals to I and Q signals. I signal indicates in-phase components; and Q signal indicates quadrature components. Subsequently, low pass filtering is performed to filter the interference signal remaining in the modulation signal. The two steps are the same as the prior art, and are not described in detail. In this embodiment, the signal of the first channel refers to the low pass-filtered signal of the first signal; and the interference signal remaining in the signal of the first channel is reduced as compared with the initially received modulation signal.

Figure 3:
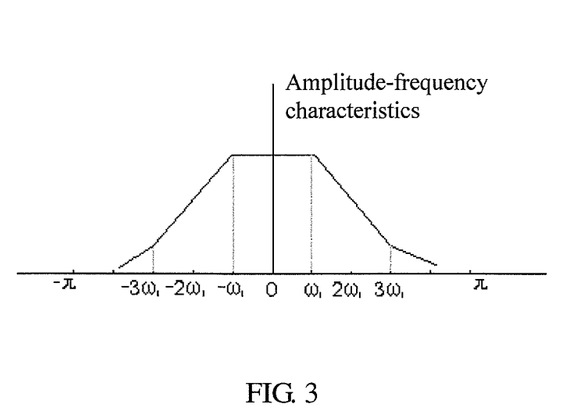
FIG. 3 is a diagram of amplitude-frequency characteristics of a low pass filter in a modem.
Figure 4:
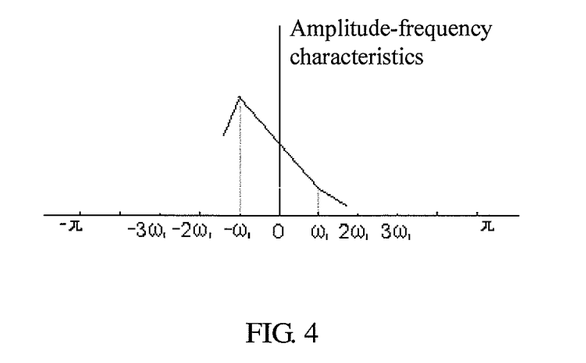
FIG. 4 is a diagram of amplitude-frequency characteristics of a reconstruction filter according to an embodiment of the present invention.

The cancellation signal is filtered by a reconstruction filter. The reconstruction filter is similar to a low pass filter. The pass band width is a channel bandwidth and therefore the transition band characteristics are attenuated quickly. However, the pass band characteristics are the same as the transition band characteristics of the first adjacent channel of the low pass filter in the modem, including phase characteristics and amplitude variation characteristics, so that phase characteristics and amplitude variation characteristics of the signal are the same as the related characteristics of the interference signal remaining in the signal of the first channel. The above description may be understood with reference to FIG. 3 and FIG. 4. FIG. 3 is a diagram of amplitude-frequency characteristics of a low pass filter in a modem. As seen from the figure, the amplitude-frequency is symmetric against the zero point, where the channel bandwidth is $2\omega_1$, and the amplitude-frequency is in monotone decrease within $\omega_1 – 3\omega_1$. As shown in FIG. 3, in a practical system, adjacent channel suppression (the transition band characteristics) implemented by the low pass filter may reach 30-40 dB. FIG. 4 is a diagram of amplitude-frequency characteristics of a reconstruction filter. The channel bandwidth is $2\omega_1$, and the amplitude-frequency is in monotone decrease within the transition band. The amplitude-frequency characteristics within $-\omega_1-\omega_1$ in the pass band are the same as the transition band amplitude-frequency characteristics of the low pass filter in the modem. Similarly, the phase-frequency characteristics of the reconstruction filter are the same as the transition band phase-frequency characteristics of the low pass filter in the modem.

The interference signal can be cancelled only when the frequency of the filtered cancellation signal is the same as a frequency of the interference signal. Therefore, the frequency of the filtered cancellation signal is adjusted to the frequency of the interference signal.

104. Multiply the cancellation signal with the adjusted frequency by a gain factor to obtain a signal to be cancelled.

The gain factor is the amplification coefficient, and is variable. The cancellation signal with the adjusted frequency is multiplied by the gain factor. The variation of the gain factor may enable the signal to be cancelled to be close to the interference signal as far as possible.

105. Subtract the signal to be cancelled from the signal of the first channel, and cancel the interference signal to obtain a signal to be decoded.

The interference signal remains in the signal of the first channel, therefore when the signal to be cancelled gets close to the interference signal as far as possible, the signal to be cancelled is subtracted from the signal of the first channel to cancel the interference signal, thereby obtaining the signal to be decoded. Therefore, the interference signal is basically cancelled from the signal to be decoded, and the quality of the decoded signal is improved.

The embodiment of the present invention includes: receiving the signal of the first channel, where the interference signal of an adjacent channel remains in the signal of the first channel; receiving the cancellation signal provided by the adjacent channel for canceling the interference signal; filtering the received cancellation signal so that phase characteristics and amplitude variation characteristics of the filtered cancellation signal are the same as phase characteristics and amplitude variation characteristics of the interference signal remaining in the signal of the first channel; adjusting the frequency of the filtered cancellation signal, where the adjusted frequency of the cancellation signal is the same as the frequency of the interference signal; multiplying the cancellation signal with the adjusted frequency by the gain factor to obtain the signal to be cancelled; and subtracting the signal to be cancelled from the signal of the first channel, and canceling the interference signal to obtain the signal to be decoded. Compared with the prior art, the method for canceling adjacent channel interference according to the embodiment of the present invention can cancel the interference signal of the adjacent channel, improve the signal to noise ratio, and ensure the stable application of high-order QAM modulation.

Figure 5:
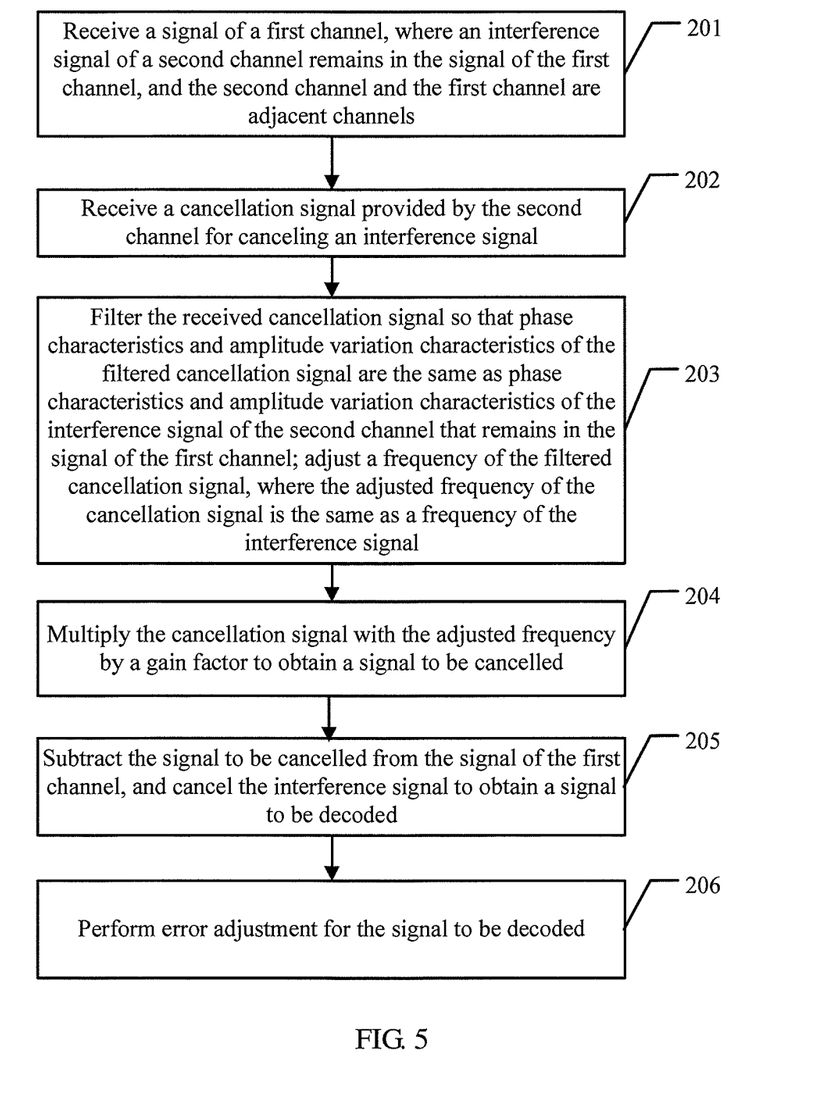
FIG. 5 is a schematic diagram of a method for a canceling interference signal according to another embodiment of the present invention.

Referring to FIG. 5, a method for canceling adjacent channel interference according to another embodiment of the present invention includes:

201. Receive a signal of a first channel, where an interference signal of a second channel remains in the signal of the first channel, and the second channel and the first channel are adjacent channels.

This step is the same as 101, which is not detailed herein again.

202. Receive a cancellation signal provided by the second channel for canceling an interference signal.

This step is the same as 102.

203. Filter the received cancellation signal so that phase characteristics and amplitude variation characteristics of the filtered cancellation signal are the same as phase characteristics and amplitude variation characteristics of the interference signal of the second channel that remains in the signal of the first channel; adjust a frequency of the filtered cancellation signal, where the adjusted frequency of the cancellation signal is the same as a frequency of the interference signal.

This step is the same as 103.

204. Multiply the cancellation signal with the adjusted frequency by a gain factor to obtain a signal to be cancelled.

This step is the same as 104.

205. Subtract the signal to be cancelled from the signal of the first channel, and cancel the interference signal to obtain a signal to be decoded.

This step is the same as 105.

206. Perform error adjustment for the signal to be decoded.

After the signal to be decoded is obtained in step 205, the interference signal in the signal to be decoded cannot be completely cancelled. In this case, the error adjustment method can be further used to minimize the interference signal remaining in the signal to be decoded.

Before an error in the signal to be decoded is cancelled, the error needs to be firstly calculated. The error may be calculated by using two solutions.

One solution is:

filtering the interference signal remaining in the signal to be decoded, and using the power of the interference signal remaining in the signal to be decoded as the error, where a center frequency of the band pass filter used for filtering the interference signal is a center frequency of the interference signal, the bandwidth is equal to the bandwidth of the interference signal, and the transition band rectangular coefficient is good, that is, steep.

The other solution is:

filtering the adjacent channel interference signal remaining in the signal of the first channel, where the low pass filter is used to filter the signal of the first channel, the pass band width is a channel bandwidth, and the transition band rectangular coefficient is good, that is, steep;

subtracting the filtered signal of the first channel from the signal to be decoded to obtain a difference signal, and using the power of the difference signal as the error.

After the error is calculated, the error converges by adjusting the gain factor. When the error converges to the minimum, the system is the most stable.

The impact of the gain factor on the error may be understood by referring to the following relationships:

signal to be cancelled=cancellation signal with the adjusted frequency×gain factor; (the cancellation signal with the adjusted frequency will not change);

signal to be decoded=signal of the first channel−signal to be cancelled;

error 1=remaining interference signal after wanted signal is filtered from the signal to be decoded;

error 2=signal to be decoded−further filtered signal of the first channel.

An analysis on the above formulas shows that the gain factor in the initial state is zero, and that the signal to be cancelled become stronger when the gain factor is larger; therefore, the wanted basic signal in the signal to be decoded remains unchanged, the remaining interference signal becomes smaller, and therefore error 1 is reduced; as regards error 2, the error 2 becomes smaller because it only relates to the interference signal remaining in the signal to be decoded.

The gain factor affects the signal to be cancelled, the gain factor in the initial state is zero, and the error decreases when the gain factor increases; therefore, the system converges to enter a stable state if the gain factor continuously increases to minimize the error. After the system enters the stable state, if the gain factor continuously increases, the error becomes larger. In this case, the gain factor is reduced subsequently to minimize the error, and therefore the system enters a stable dynamic balanced state.

In the embodiment of the present invention, based on the embodiment corresponding to FIG. 2, error adjustment is performed for the signal to be decoded, and the gain factor is adjusted according to the change of the error. This may adaptively cancel the interference signal in the signal of the first channel. Compared with the prior art, the method for canceling adjacent channel interference according to the embodiment of the present invention can cancel the interference signal of an adjacent channel as far as possible, ensure the stable application of high-order QAM modulation, and better solve the problem of selective attenuation of the frequency due to a multipath effect in the microwave environment.

For ease of understanding, the following uses a specific application scenario as an example to describe the method for canceling adjacent channel interference according to the embodiments of the present invention.

Figure 6:
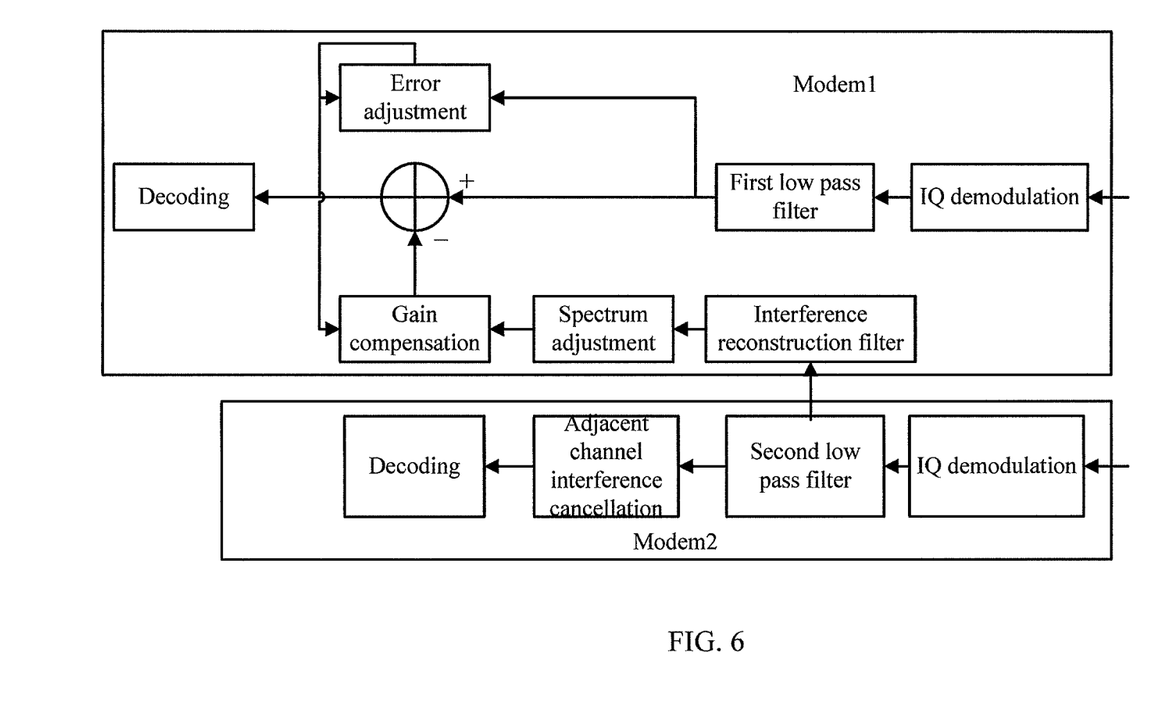
FIG. 6 is a schematic diagram of an application scenario according to an embodiment of the present invention.

Referring to FIG. 6, the execution processes of a modem 1 and a modem 2 in FIG. 6 are the same. One specific execution structure of the modem 1 is illustrated in detail. Adjacent channel interference cancellation of the modem 2 may be considered to be identical with the parts of the interference reconstruction filter, spectrum adjustment, gain compensation, and error adjustment of the modem 1.

The modem 1 receives an intermediate frequency signal, and recovers IQ data by using an 10 demodulation module. The IQ data is filtered by a first filter and enters an adjacent channel interference cancellation module as a signal of a first channel to cancel an adjacent channel interference signal in the signal of the first channel. The first channel and a second channel are adjacent channels, and the signal of the first channel and a signal of the second channel are mutual interference signals.

The modem 2 receives an intermediate frequency signal, and recovers the IQ data by using the IQ demodulation module. The IQ data is filtered by a second filter, one path of the IQ data is sent to a local adjacent channel interference cancellation module as the signal of the second channel, and the other path of the IQ data is sent to the modem 1 as a cancellation signal to cancel the adjacent channel interference signal in the signal of the first channel that are received by the modem 1.

After being sent to the modem 1, the cancellation signal is processed by an interference reconstruction filter, adjusted, by using spectrum adjustment, to the same frequency as the adjacent channel interference signal in the signal of the first channel, and multiplied by a gain factor to obtain a signal to be cancelled.

The interference reconstruction filter is similar to a low pass filter, the pass band width is a channel bandwidth, and therefore the transition band characteristics are attenuated quickly; however, the pass band characteristics are the same as the transition band characteristics of the first adjacent channel of the low pass filter in the modem, including phase characteristics and amplitude variations characteristics.

The signal to be cancelled is subtracted from the signal of the first channel of the modem 1, and experience adaptive error adjustment. When the error converges, the signal to be decoded with the adjacent channel interference cancelled is obtained, and service data is obtained after the signal is decoded by a decoding module.

The error may be generated by using two methods. One method is filtering wanted signal in the signal to be decoded and extracting the remaining interference signal by using a band pass filter having a good rectangular coefficient, and using the power of the remaining interference signal as the error, where a pass band center frequency of the band pass filter is a center frequency of the interference signal, and a 3 dB bandwidth is the bandwidth of the interference signal. When the error is minimized, the system enters an optimal state. The other method is filtering the interference signal to be cancelled in the signal of the first channel by using a low pass filter with a channel bandwidth as the bandwidth and with a good rectangular coefficient, subtracting the interference signal from the signal to be decoded, using the calculated power as the error. When the error is minimized (close to zero), the system enters an optimal state.

The collaboration process of the error determining module and the gain factor is as follows: The gain factor in the initial state is zero, and the error decreases when the gain factor increases; therefore, the system converges to enter a stable state if the gain factor continuously increases to minimize the error. After the system enters the stable state, if the gain factor continuously increases, the error becomes larger. In this case, the gain factor is reduced subsequently to minimize the error, and therefore the system enters a stable dynamic balanced state.

The adjacent channel interference cancellation technology of the modem 2 is the same as that of the modem 1, which is not detailed herein again.

In this application scenario, the method for canceling adjacent channel interference, where two modems send a cancellation signal to each other to cancel the interference signal in the signal of respective channels, is described in detail.

Figure 7:
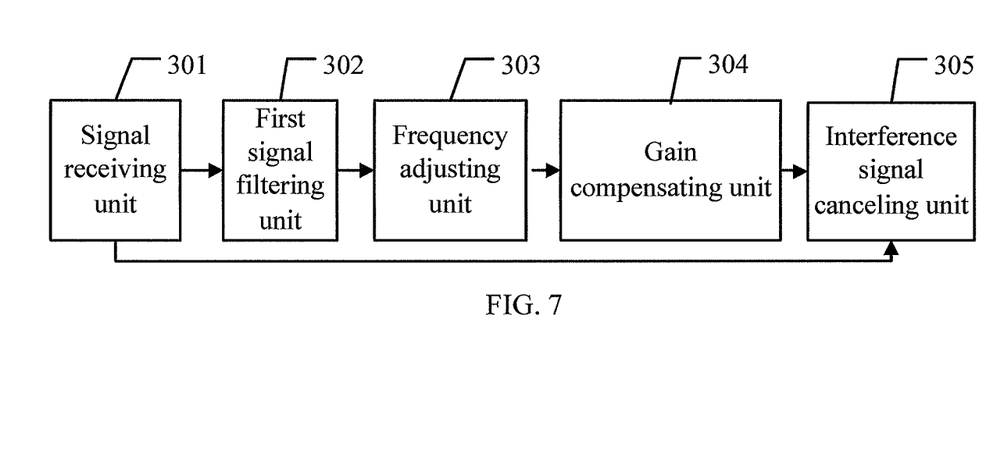
FIG. 7 is a schematic diagram of a modem according to an embodiment of the present invention.

Referring to FIG. 7, a modem according to an embodiment of the present invention includes:

a signal receiving unit 301, configured to receive a signal of a first channel, where an interference signal of a second channel remains in the signal of the first channel, and the second channel and the first channel are adjacent channels;

where the signal receiving unit 301 is further configured to receive a cancellation signal provided by the second channel for canceling the interference signal;

a first signal filtering unit 302, configured to filter the cancellation signal received by the signal receiving unit 301 so that phase characteristics and amplitude variation characteristics of the filtered cancellation signal are the same as phase characteristics and amplitude variation characteristics of the interference signal of the second channel that remains in the signal of the first channel;

where the first signal filtering unit is a reconstruction filter, the reconstruction filter is similar to a low pass filter, the pass band width is a channel bandwidth, and therefore the transition band characteristics are attenuated quickly; however, the pass band characteristics are the same as the transition band characteristics of the first adjacent channel of the low pass filter in the modem, including phase characteristics and amplitude variation characteristics;

a frequency adjusting unit 303, configured to adjust a frequency of the cancellation signal filtered by the first signal filtering unit 302, where the adjusted frequency of the cancellation signal is the same as a frequency of the interference signal;

a gain compensating unit 304, configured to multiply the cancellation signal with the frequency adjusted by the frequency adjusting unit 303 by a gain factor to obtain a signal to be cancelled; and an interference signal canceling unit 305, configured to subtract the signal to be cancelled that are obtained by the gain compensating unit 304, from the signal of the first channel received by the receiving unit, and cancel the interference signal to obtain a signal to be decoded.

In one embodiment of the present invention, the signal receiving unit 301 receives the signal of the first channel, where the interference signal of the second channel remains in the signal of the first channel, and the second channel and the first channel are adjacent channels; the signal receiving unit 301 further receives the cancellation signal provided by the second channel for canceling the interference signal; the first signal filtering unit 302 filters the cancellation signal received by the signal receiving unit 301 so that phase characteristics and amplitude variation characteristics of the filtered cancellation signal are the same as phase characteristics and amplitude variation characteristics of the interference signal of the second channel that remains in the signal of the first channel; the frequency adjusting unit 303 adjusts the frequency of the cancellation signal filtered by the first signal filtering unit 302, where the adjusted frequency of the cancellation signal is the same as the frequency of the interference signal; the gain compensating unit 304 multiplies the cancellation signal with the frequency adjusted by the frequency adjusting unit 303 by the gain factor to obtain the signal to be cancelled; and the interference signal canceling unit 305 subtracts the signal to be cancelled that are obtained by the gain compensating unit 304, from the signal of the first channel, and cancels the interference signal to obtain the signal to be decoded. Compared with the prior art, the method for canceling adjacent channel interference according to the embodiment of the present invention can cancel the interference signal of an adjacent channel as far as possible, improve the signal to noise ratio, and ensure the stable application of high-order QAM modulation.

Figure 8:
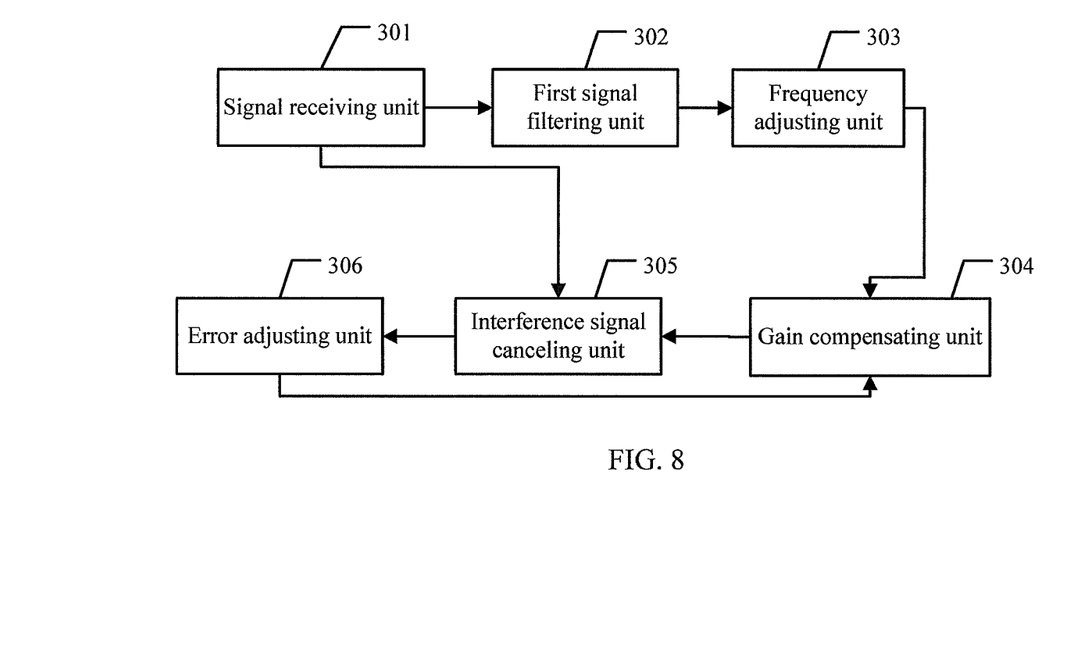
FIG. 8 is a schematic diagram of a modem according to another embodiment of the present invention.

Referring to FIG. 8, based on the embodiment corresponding to FIG. 7, the modem according to another embodiment of the present invention further includes:

an error adjusting unit 306, configured to: after the interference signal canceling unit 305 obtains the signal to be decoded, perform error adjustment for the signal to be decoded.

In the embodiment of the present invention, after the signal canceling unit 305 obtains the signal to be decoded, the error adjusting unit 306 performs error adjustment for the signal to be decoded, and the gain compensating unit 304 adjusts the gain factor. This minimizes the error and therefore minimizes the interference signal.

Figure 9:
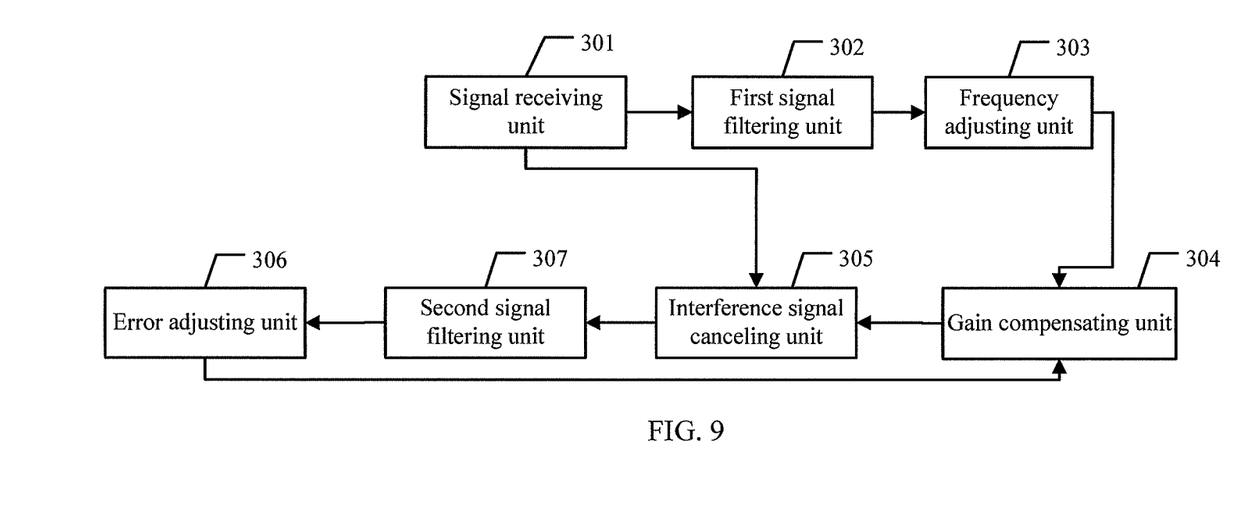
FIG. 9 is a schematic diagram of a modem according to another embodiment of the present invention.

Based on the embodiment corresponding to FIG. 8, referring to FIG. 9, the modem according to an embodiment of the present invention further includes:

a second signal filtering unit 307, configured to filter an interference signal remaining in the signal to be decoded;

where the error adjusting unit 306 is further configured to use the power of the remaining interference signal filtered by the second signal filtering unit 307 as the error.

According to the modem provided in one embodiment of the present invention, the second signal filtering unit 307 filters the interference signal remaining in the signal to be decoded; the error adjusting unit 306 uses the power of the remaining interference signal filtered by the second signal filtering unit 306 as the error; and the gain compensating unit 304 adjusts the gain factor to obtain the minimum error. The system enters the stable state when the error is minimum.

Figure 10:
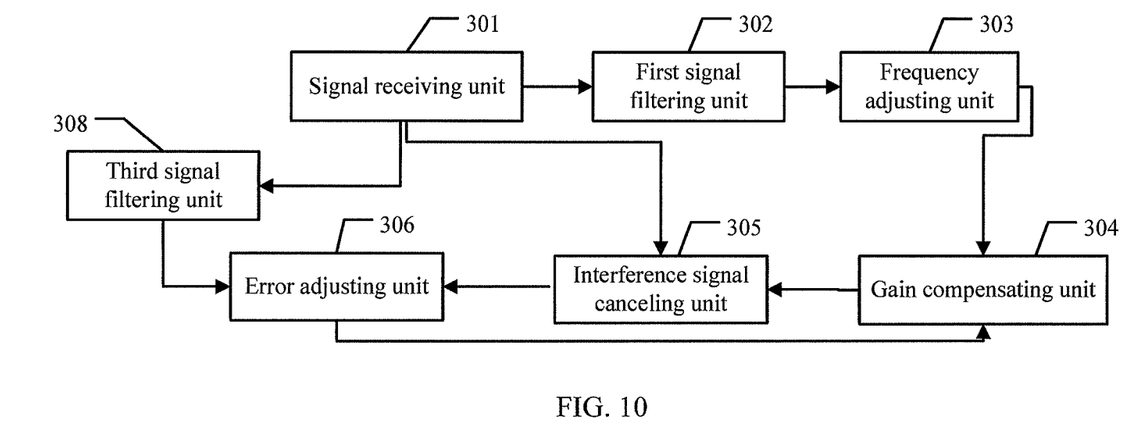
FIG. 10 is a schematic diagram of a modem according to another embodiment of the present invention.

Based on the embodiment corresponding to FIG. 8, referring to FIG. 10, the modem according to an embodiment of the present invention further includes:

a third signal filtering unit 308, configured to filter an adjacent channel interference signal remaining in the signal of the first channel;

where the error adjusting unit 306 is further configured to subtract the filtered signal of the first channel from the signal to be decoded to obtain a difference signal, and use the power of the difference signal as the error.

According to the modem provided in this embodiment of the present invention, the third signal filtering unit 308 filters the adjacent channel interference signal remaining in the signal of the first channel; the error adjusting unit 306 subtracts the filtered signal of the first channel from the signal to be decoded to obtain difference signal, and uses the power of the difference signal as the error; and the gain compensating unit 304 adjusts the gain factor to obtain the minimum error. The system enters the stable state when the error is minimum.

Figure 11:
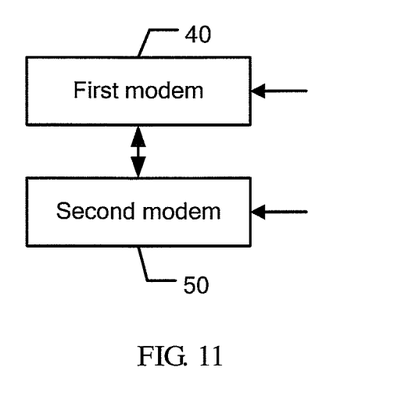
FIG. 11 is a schematic diagram of a digital microwave system according to an embodiment of the present invention.

Referring to FIG. 11, a digital microwave system according to an embodiment of the present invention includes:

a first modem and a second modem that have the functions described in the above embodiments, where the first modem is located in a first channel, the second modem is located in a second channel, the first channel and the second channel are adjacent channels, and a signal of the first channel and a signal of the second channel are mutual interference signals; the first modem receives the signal of the first channel, and interference signal of the second channel remains in the signal of the first channel; and the second modem receives the signal of the second channel, and an interference signal of the first channel remains in the signal of the second channel.

From the perspective of the first modem, the first modem, after receiving the signal of the first channel, further receives a cancellation signal provided by the second channel for canceling the interference signal.

The first modem filters the received cancellation signal so that phase characteristics and amplitude variation characteristics of the filtered cancellation signal are the same as phase characteristics and amplitude variation characteristics of the interference signal of the second channel that remains in the signal of the first channel.

The first modem adjusts a frequency of the filtered cancellation signal, where the adjusted frequency of the cancellation signal is the same as the frequency of the interference signal; multiplies the cancellation signal with the adjusted frequency by a gain factor to obtain a signal to be cancelled; and subtracts the signal to be cancelled from the signal of the first channel, and cancels the interference signal to obtain a signal to be decoded.

The process of canceling the adjacent channel interference signal by the second modem is the same as that by the first modem, except that the received adjacent channel interference signal is the interference signal of the first channel.

The digital microwave system provided in one embodiment of the present invention is capable of basically canceling the interference signal of an adjacent channel, improving the signal to noise ratio, and ensuring the stable application of high-order QAM modulation.

Persons of ordinary skill in the art understand that all or part of the steps of the method according to the above embodiments may be implemented by a program instructing relevant hardware. The program may be stored in a computer readable storage medium. The storage medium may include a ROM, a RAM, a magnetic disk, or an optical disk, and like.

A method, a modem, and a system for canceling adjacent channel interference that are provided in the embodiments of the present invention are introduced in detail in the foregoing. In this specification, specific examples are used to describe the principles and implementation manners of the present invention. The foregoing descriptions of the embodiments are merely used to help understand the method and core idea of the present invention. Meanwhile, persons of ordinary skill in the art may make modifications to the specific implementation manners and application scopes according to the idea of the present invention. In conclusion, the content of the specification should not be understood as a limitation to the present invention.

What is claimed is:

1. A method for canceling adjacent channel interference, the method comprising:
   receiving a signal of a first channel, wherein an interference signal of a second channel remains in the signal of the first channel, and the second channel and the first channel are adjacent channels;
   receiving a cancellation signal provided by the second channel for canceling the interference signal;
   filtering the received cancellation signal so that phase characteristics and amplitude variation characteristics of the filtered cancellation signal are the same as phase characteristics and amplitude variation characteristics of the interference signal of the second channel that remains in the signal of the first channel;
   adjusting a frequency of the filtered cancellation signal, wherein the adjusted frequency of the cancellation signal is the same as a frequency of the interference signal;
   multiplying the cancellation signal with the adjusted frequency by a gain factor to obtain a signal to be cancelled;
   subtracting the signal to be cancelled from the signal of the first channel, and canceling the interference signal to obtain a signal to be decoded; and
   after obtaining the signal to be decoded, performing error adjustment for the signal to be decoded, comprising:
   calculating an error; and
   adjusting the gain factor to minimize the calculated error.

2. The method for canceling adjacent channel interference according to claim 1, wherein calculating the error comprises:
   filtering an interference signal remaining in the signal to be decoded, and using the power of the interference signal remaining in the signal to be decoded as the error.

3. The method for canceling adjacent channel interference according to claim 1, wherein calculating the error comprises:
   filtering an interference signal remaining in the signal of the first channel; and
   subtracting the filtered signal of the first channel from the signal to be decoded to obtain a difference signal, and using the power of the difference signal as the error.

4. A modem, comprising:
   a signal receiving unit, configured to receive a signal of a first channel, wherein an interference signal of a second channel remains in the signal of the first channel, and the second channel and the first channel are adjacent channels;
   wherein the signal receiving unit is further configured to receive a cancellation signal provided by the second channel for canceling the interference signal;
   a first signal filtering unit, configured to filter the cancellation signal received by the signal receiving unit so that phase characteristics and amplitude variation characteristics of the filtered cancellation signal are the same as phase characteristics and amplitude variation characteristics of the interference signal of the second channel that remains in the signal of the first channel;
   a frequency adjusting unit, configured to adjust a frequency of the cancellation signal filtered by the first signal filtering unit, wherein the adjusted frequency of the cancellation signal is the same as a frequency of the interference signal;
   a gain compensating unit, configured to multiply the cancellation signal with the frequency adjusted by the frequency adjusting unit by a gain factor to obtain a signal to be cancelled;
   an interference signal canceling unit, configured to subtract the signal to be cancelled that is obtained by the gain compensating unit, from the signal of the first channel, and cancel the interference signal to obtain a signal to be decoded; and
   an error adjusting unit configured to calculate an error and adjust the gain factor to minimize the calculated error.

5. The modem according to claim 4, further comprising:
   a second signal filtering unit, configured to filter an interference signal remaining in the signal to be decoded;
   wherein the error adjusting unit is further configured to use the power of the remaining interference signal filtered by the second signal filtering unit as the error.

6. The modem according to claim 4, further comprising:
   a third signal filtering unit, configured to filter an interference signal remaining in the signal of the first channel;
   wherein the error adjusting unit is further configured to subtract the filtered signal out of the third signal filtering unit from the signal to be decoded to obtain a difference signal, and use the power of the difference signal as the error.

* * * * *